No. 800,505. PATENTED SEPT. 26, 1905.
J. W. SMITH.
HARROW TOOTH.
APPLICATION FILED MAY 22, 1905.
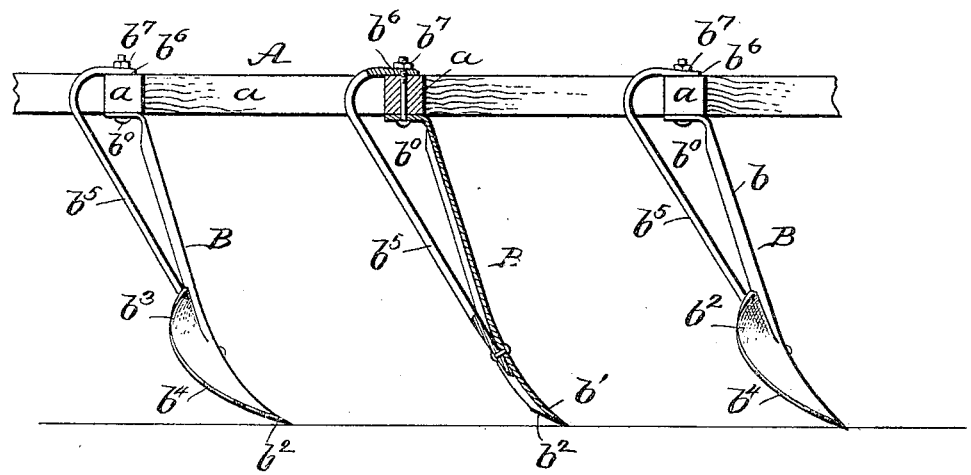
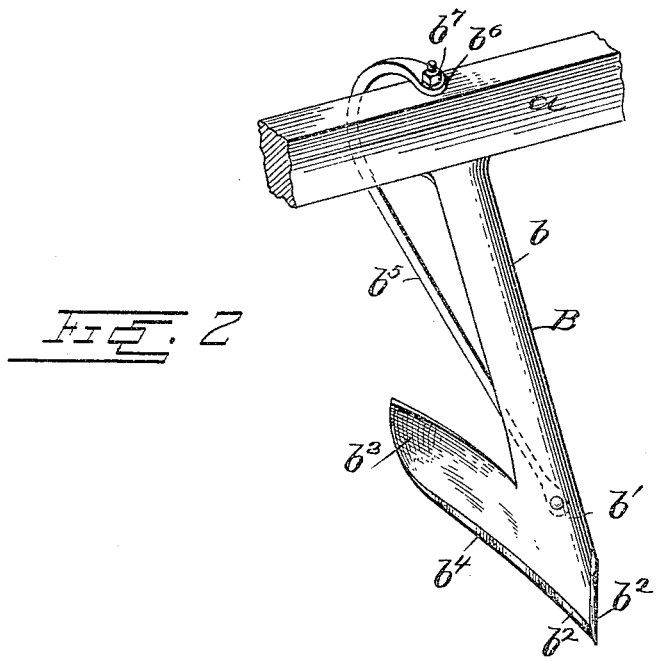
WITNESSES:
Jos. A. Ryan
C. E. Trainor
INVENTOR
JAMES W. SMITH
BY Munn & Co
ATTORNEYS

UNITED STATES PATENT OFFICE.

JAMES WILSON SMITH, OF TROUPE, TEXAS.

HARROW-TOOTH.

No. 800,505.  Specification of Letters Patent.  Patented Sept. 26, 1905.

Application filed May 22, 1905. Serial No. 261,590.

*To all whom it may concern:*

Be it known that I, JAMES WILSON SMITH, a citizen of the United States, and a resident of Troupe, in the county of Smith and State of Texas, have made certain new and useful Improvements in Harrow-Teeth, of which the following is a specification.

My invention is an improvement in harrow-teeth; and it consists in certain novel constructions and combinations of parts hereinafter described and claimed.

Referring to the drawings forming a part hereof, Figure 1 is a side elevation, partly in section, of a harrow provided with my improved tooth; and Fig. 2 is a perspective view of a single tooth.

In the practical application of my invention I provide a frame A of ordinary construction and comprising longitudinal and cross bars $a$. The bars may be arranged in the ordinary A shape or rectangularly, as desired. A plurality of teeth B are secured to the bars of the frame by bolts $b^0$, traversing the bars and an angular portion of the tooth. Each of the teeth B comprises a convex shank $b$, terminating in a convex blade $b'$, having its edges cut obliquely away, as at $b^2$, to form a point, and one side of the blade is extended upwardly and outwardly to form a concavo-convex moldboard $b^3$, whose outer edge $b^4$ forms a continuation of the oblique edge of the blade. A brace $b^5$ is secured to the rear face of the blade and extends upwardly and backwardly to the top of the bar $a$, to which the tooth is secured, and has formed in the end thereof an eye $b^6$, engaging the bolt $b^0$ and secured by the nut $b^7$.

While I have shown my improved tooth as applied to a harrow, I do not limit myself to this construction, since it is evident that the tooth is equally applicable for use in cultivators.

In the present instance I have shown my improved tooth as constructed from a single piece of steel, with the shank, blade, and moldboard integral, and this is the preferred form of construction; but the blade may be formed of a separate piece, or the shank, blade, and moldboard may be each formed separately.

Among the advantages of my improvement may be mentioned a more thorough cultivation and pulverization of the soil. A closer cultivation of crops may be also attained by its use. When used in a cultivator, a much more thorough eradication of weeds is secured than by the use of the ordinary cultivator-point, since the weeds are cut off beneath the surface of the ground and are turned under the dirt instead of being merely scratched, as with the ordinary construction.

While I have shown and described my invention as applied to the ordinary form of harrow, it will be evident that by using a properly-curved shank it is capable of being used with spring-toothed harrows and cultivators, the brace, however, being omitted when so used.

Having thus described my invention, what I claim as new, and desire to secure by Letters Patent, is—

1. In a harrow, the combination of a frame a plurality of teeth secured to the frame, each comprising a shank, a convex blade integral with the shank and cut away obliquely to form a point, a moldboard extending upwardly and outwardly from one side of the blade, its outer edge forming a continuation of the obliquely-cut edge of the blade, and a brace connecting the rear of the blade with the frame.

2. In a harrow the combination of a frame, a plurality of teeth secured to the frame each comprising a shank, a convex blade integral with the shank and cut away obliquely to form a point, and a moldboard integral with the blade, its outer edge forming a continuation of the obliquely-cut edge of the blade.

3. In a harrow, the combination of a frame, a plurality of teeth secured to the frame each comprising a shank a convex blade integral therewith and a moldboard extending laterally from the convex blade.

4. A harrow-tooth, comprising a shank, a convex blade integral therewith, and cut away obliquely to form a point, a laterally-extending moldboard on the convex blade, the outer edge of the moldboard forming a continuation of the oblique edge of the blade.

JAMES WILSON SMITH.

Witnesses:
J. H. GRIFFIN,
M. M. JOYNER.